United States Patent [19]

Templin

[11] 4,024,458
[45] May 17, 1977

[54] ELECTRICAL SIGNAL GENERATING SYSTEM

[75] Inventor: Jackson R. Templin, Anderson, Ind.

[73] Assignee: General Motors Corporation, Detroit, Mich.

[22] Filed: June 15, 1976

[21] Appl. No.: 696,411

[52] U.S. Cl. .................................. 328/133; 328/55; 310/168; 307/247 R; 307/232; 307/309; 324/34 PS; 324/34 GT; 123/102; 123/117 D

[51] Int. Cl.$^2$ ...................... H03B 3/04; F02P 5/08; G01P 3/66

[58] Field of Search ............... 328/1, 55, 133, 134; 307/232, 247 R, 309; 310/168; 324/34 PS, 34 D, 34 GT; 123/102, 117 D, 117 R, 148 DK, 148 E, 148 F

[56] References Cited

UNITED STATES PATENTS

| | | | |
|---|---|---|---|
| 3,728,565 | 4/1973 | O'Callaghan | 310/168 |
| 3,732,494 | 5/1973 | Dragon | 324/34 GT |
| 3,741,176 | 6/1973 | Schmidt et al. | 128/102 X |
| 3,755,745 | 8/1973 | Sapir | 328/133 |
| 3,798,556 | 3/1974 | Ooya et al. | 328/133 |
| 3,915,131 | 10/1975 | Brungsberg | 128/148 E |
| 3,930,201 | 12/1975 | Ackermann et al. | 328/1 |
| 3,939,416 | 2/1976 | Maskery | 324/34 D |
| 3,961,214 | 6/1976 | Lokkart | 310/168 X |

Primary Examiner—John S. Heyman
Attorney, Agent, or Firm—Richard G. Stahr

[57] ABSTRACT

Two phase displaced alternating current wave forms are generated by a magnetic pickup arrangement including two each split pole tips in magnetic circuit relationship with a rotatable toothed disk and structure for changing the phase relationship of each of the generated wave forms at predetermined intervals, the pole tips being mechanically separated from each other about the periphery of the disk by a distance determined by the desired wave form phase displacement and the desired duration of a periodic system output signal. Auxiliary alternating current wave forms are produced from the generated wave forms to provide a plurality of equally phase displaced alternating current wave forms and all are converted to square wave forms. A gating circuit combination initiates and terminates the system periodic output signal upon alternate changes of phase relationship of the generated wave forms and other gating circuit combination combines the squared generated and auxiliary wave forms to produce a series of other system output signal pulses of a frequency which is a multiple of the frequency of the generated and auxiliary alternating current wave forms as determined by the total number thereof.

10 Claims, 8 Drawing Figures

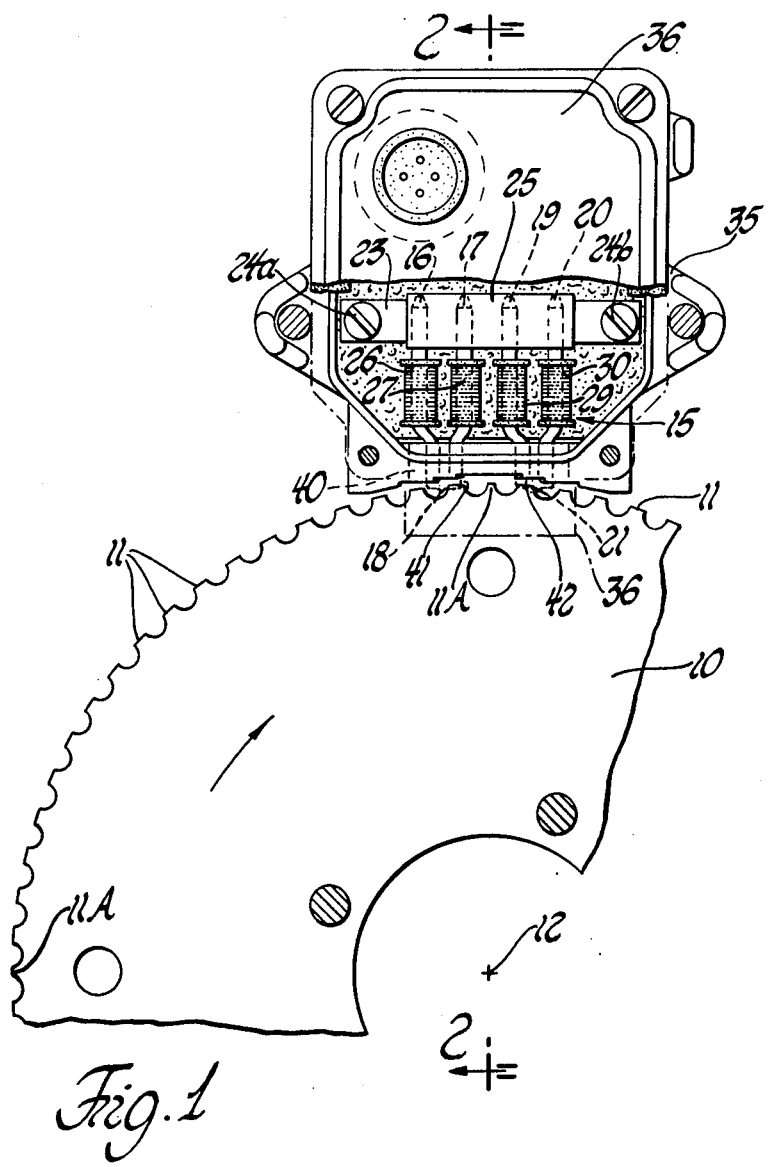
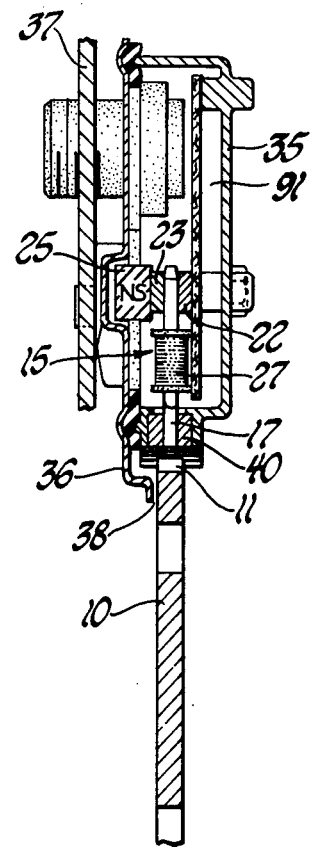
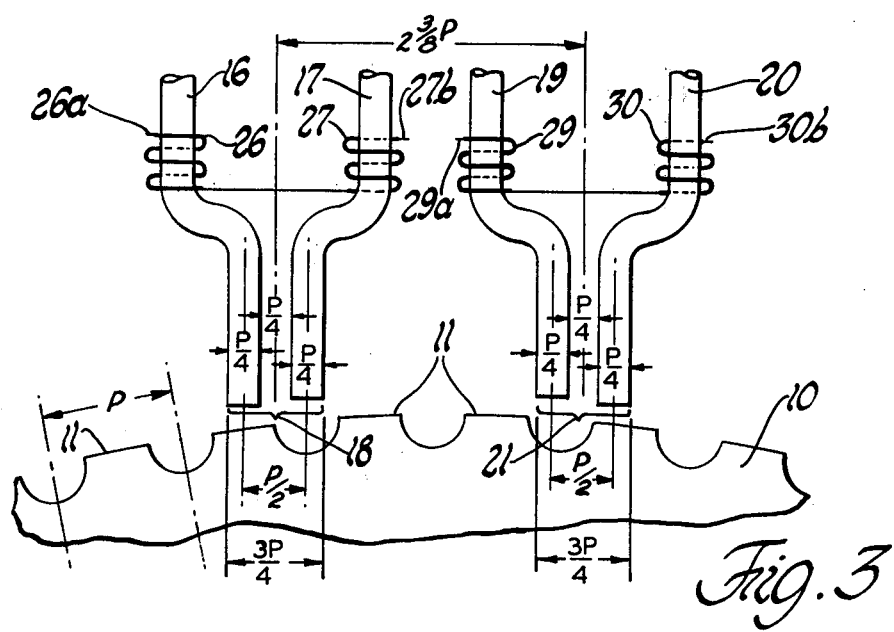
Fig. 1
Fig. 2
Fig. 3

ELECTRICAL SIGNAL GENERATING SYSTEM

This invention is directed to an electrical signal generating system and, more specifically, to an electrical signal generating and multiplying system which produces a periodic output electrical signal of a predeterminable duration and another series of output signal pulses of a predeterminable frequency.

There are many applications which require a measurement of the speed of rotation and/or the angular position of a rotating member. One prior art method of obtaining a signal proportional to the speed of rotation and/or the angular position of a rotating member is a conventional magnetic pickup assembly which produces an output signal pulse corresponding to each tooth of a disk rotated in timed relationship with the rotating member. The frequency of the output signal, therefore, is a function of the number of teeth of the rotating member. Frequently, it is necessary to produce an output signal of a frequency so high that it is impractical to fabricate a toothed disk having the number of teeth required to produce the desired output signal frequency. Furthermore, there are other applications which require in addition to the series of signal pulses of a frequency which is a function of the number of teeth of the rotating member, periodic reference signal pulses of a predeterminable duration. In the prior art, this application required separate magnetic pickups for producing the series of electrical signal pulses of a predeterminable frequency and the periodic reference signals. For example, with many modern automotive type internal combustion ignition system applications, a digital electronic computer arrangement is employed to rapidly calculate the ideal engine crankshaft position at which the ignition spark should be initiated as determined by a variety of digital input signal representations of engine operating characteristics and ambient conditions of temperature, atmospheric pressure, humidity, and so forth. As these digital computer arrangements calculate the ideal ignition spark timing angle rapidly and precisely, it is important that the engine crankshaft position be constantly and accurately indicated. A series of electrical pulses, each corresponding to a selected number of engine crankshaft degrees, may be employed to constantly monitor engine crankshaft position. Under certain conditions of engine operation with electronic spark timing systems of this type, such as low engine cranking speeds or low battery voltage, it is desirable that the ignition spark be initiated at a predetermined constant spark timing angle and that the ignition coil primary winding be energized for a sufficiently long period of time to provide adequate energizing current buildup. One method for operating an engine equipped with an electronic ignition spark timing system at low engine cranking speeds or with conditions of low battery voltage is to provide periodic electrical signals in combination with electrical circuitry responsive to the leading edge to initiate and to the trailing edge to interrupt ignition coil primary winding energizing current, the trailing edge of each signal being synchronized with engine crankshaft position to provide a preselected fixed ignition spark advance and the signal being of sufficient duration to provide adequate ignition coil primary winding energizing current buildup.

Therefore, an electrical signal generating and multiplying system which provides both periodic reference signal pulses of a predeterminable duration and another series of output signal pulses of a predeterminable frequency and is operable over a wide range of speeds; will allow a larger magnetic gap between the stationary and moving parts; has high accuracy; has a minimum of variation of internal time delays; minimizes the spurious effects of vibration, disk eccentricity and wobble, magnetized disk teeth and stray electromagnetic fields and tolerates a wide range of power supply potential is desirable.

It is, therefore, an object of this invention to provide an improved electrical signal generating system.

It is an additional object of this invention to provide an improved electrical signal generating and multiplying system.

It is an additional object of this invention to provide an improved electrical signal generating and multiplying system which produces a periodic electrical output signal of a predeterminable duration and another series of electrical output signal pulses of a predeterminable frequency.

It is a further object of this invention to provide an improved electrical signal generating and multiplying system which generates two phase displaced alternating current wave forms which are employed by additional separate gating circuitry combinations to provide a periodic output electrical signal of a predeterminable duration and a separate series of output electrical signal pulses of a frequency which is a selected integer multiple of the frequency of the generated alternating current wave forms.

In accordance with this invention, an electrical signal generating system is provided wherein the phase relationship between two phase displaced magnetic pickup generated alternating current wave forms is changed at predetermined intervals; a gating circuit combination responsive thereto initiates and terminates periodic output signals upon alternate changes of phase relationship and another gating circuit combination, responsive to the generated wave forms and other equally phase displaced auxiliary alternating current wave forms produced from the generated wave forms, produces a series of other output signal pulses of a frequency which is a multiple of the generated wave forms as determined by the total number of generated and auxiliary wave forms.

In the preferred embodiment, the electrical signal generating system of this invention was employed with an automotive type internal combustion engine electronic digital ignition spark timing system. The series of output signal pulses of a predetermined frequency produced thereby was employed to indicate the engine crankshaft position in degrees relative to piston top dead center and the leading edge of each periodic output signal was employed as a signal for synchronizing the series of high frequency output signal pulses with crankshaft position for each cylinder of the associated internal combustion engine. Additionally, each periodic output signal was employed to initiate and terminate ignition coil primary winding energization during periods of low engine cranking speeds and/or low battery voltage. Therefore, each was arranged to terminate at a predetermined fixed engine crankshaft ignition spark timing angle relative to piston top dead center and to be of a sufficiently long duration to permit adequate ignition coil primary winding energizing current buildup. External gating circuitry, which is not a part of this invention and is not indicated in the drawing, was employed to gate the periodic output signals to an electronic ignition system responsive thereto to initiate and terminate ignition coil primary winding energization during periods of low engine cranking speeds and/or low battery voltage and to gate the ignition signal pulses produced by the electronic digital ignition spark timing system to the electronic ignition system for initiating and terminating ignition coil primary winding energization as determined by the spark timing computer during periods of normal engine operation.

For a better understanding of the present invention, together with additional objects, advantages and features thereof, reference is made to the following description and accompanying drawings in which:

FIG. 1 is a front elevation view, partially in section, of the magnetic flux generating and pickup arrangement of the electrical signal generating system of this invention;

FIG. 2 is a section view of FIG. 1 taken along lines 2—2 and looking in the direction of the arrows;

FIG. 3 is an enlarged view showing the relationship between the two split pole tips of the magnetic flux generating and pickup arrangement and an associated rotatably mounted disk of magnetic material;

Figure 5:
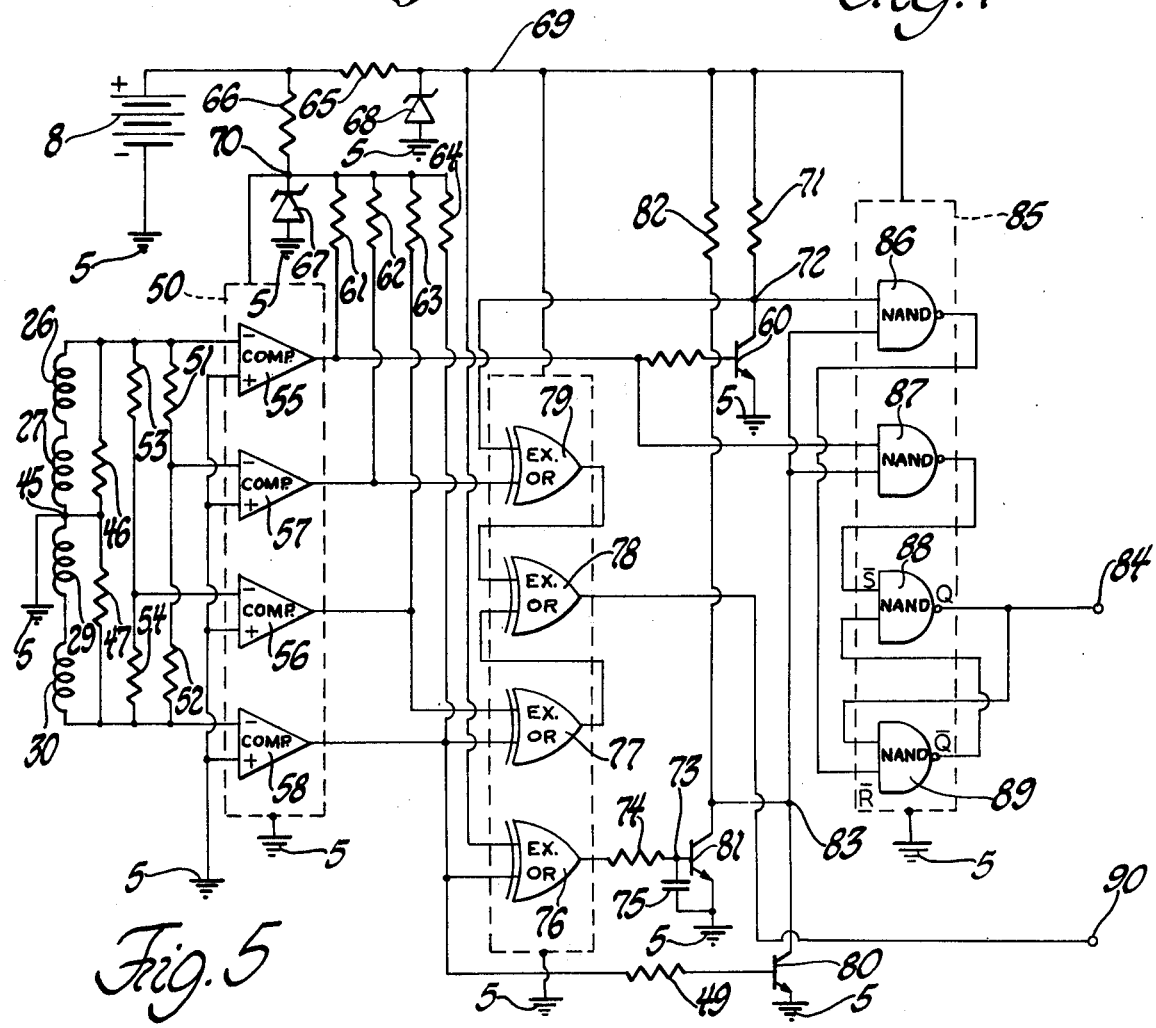
Figure 6:
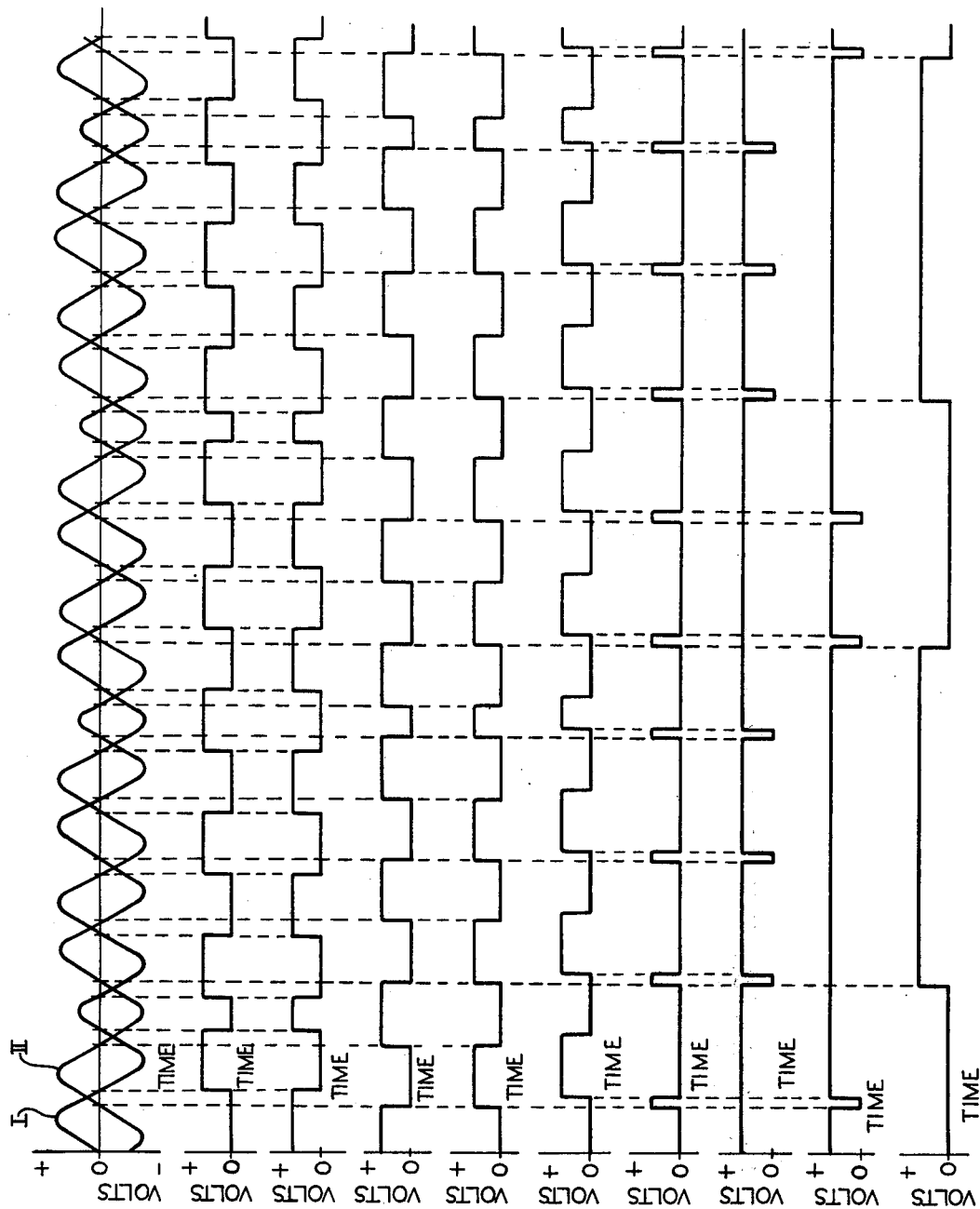
Figure 7:
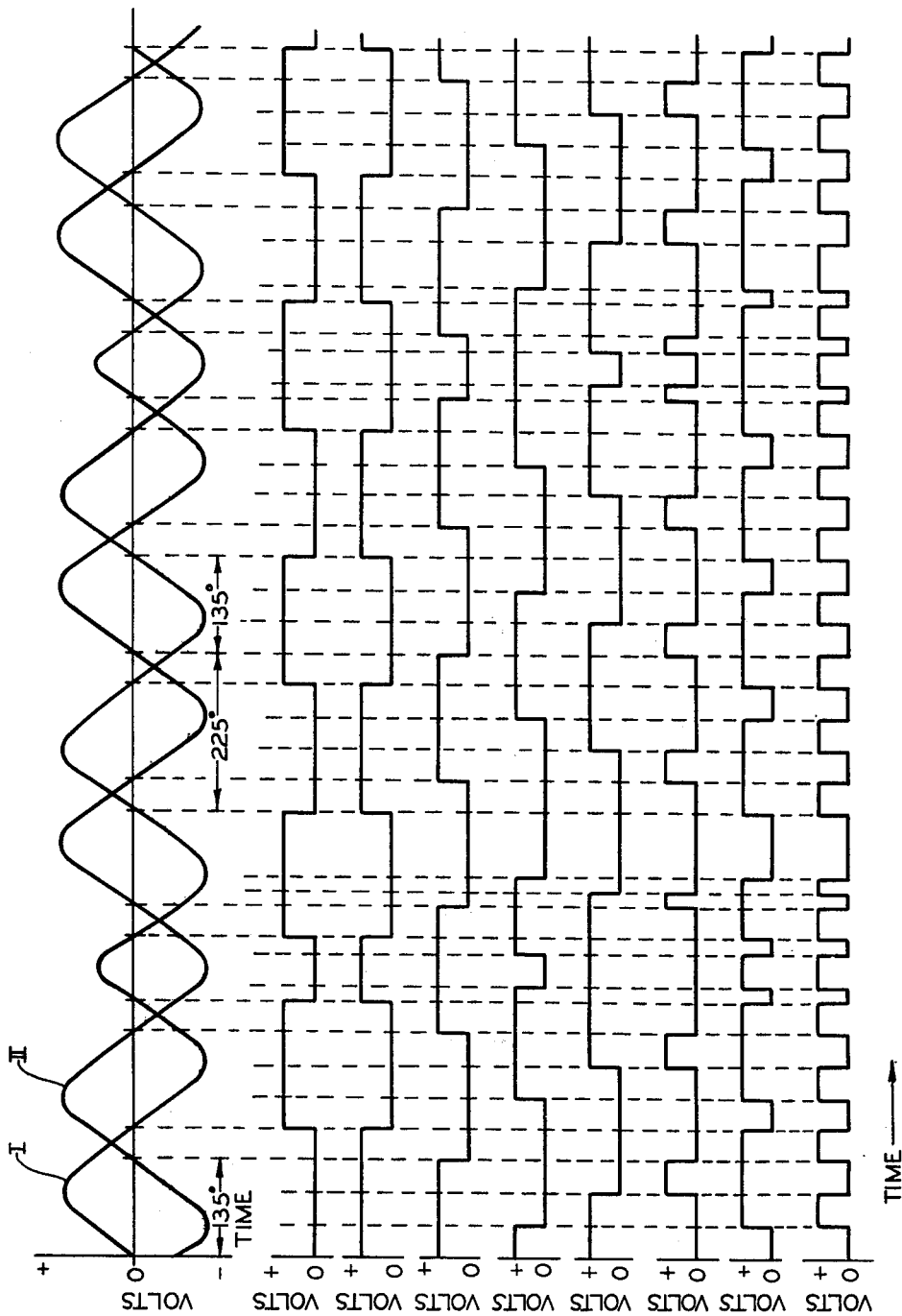
Figure 8:
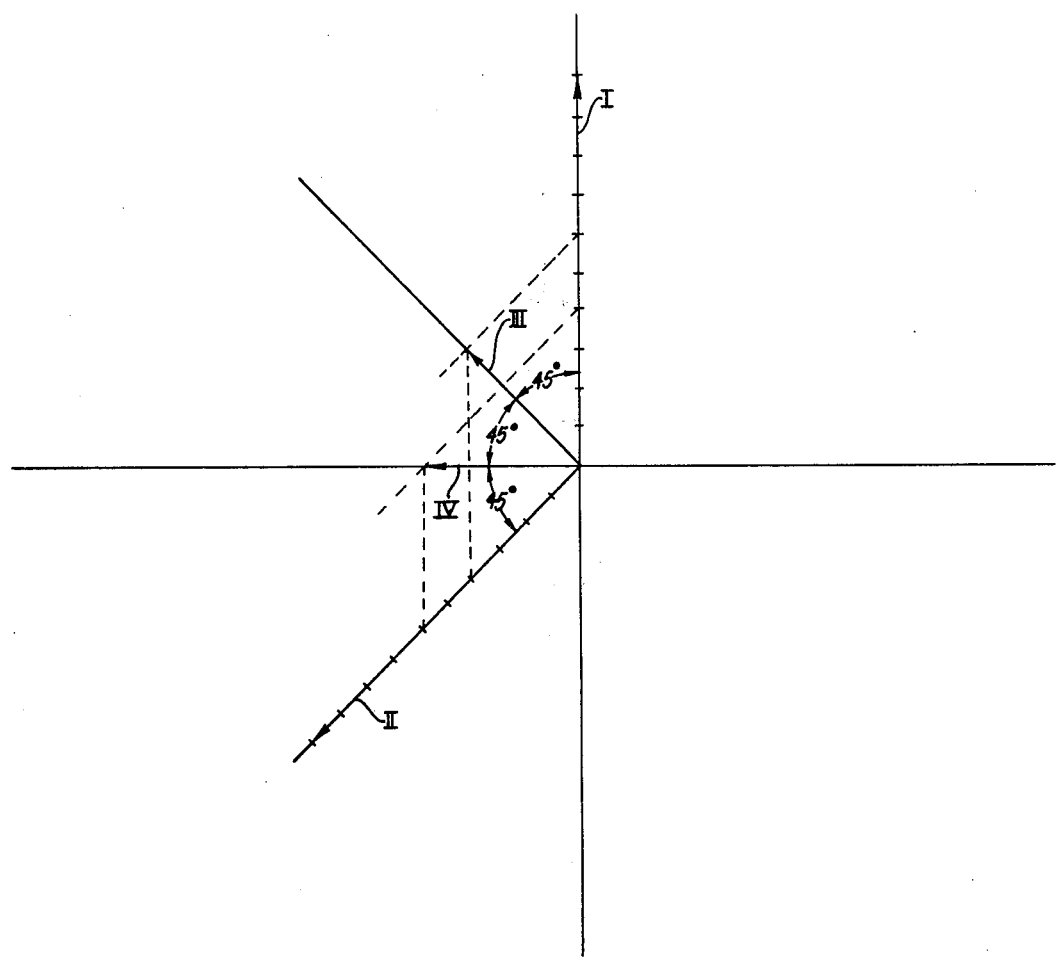

FIG. 5 sets forth the electronic circuitry of this invention partially in schematic and partially in block form;

FIG. 6 is a set of curves useful in understanding the operation of one portion of the electronic circuitry of FIG. 5;

FIG. 7 is another set of curves useful in understanding another portion of the electronic circuitry of FIG. 5; and FIG. 8 is a vector diagram useful in understanding a portion of the electronic circuitry of FIG. 5.

Figure 4:
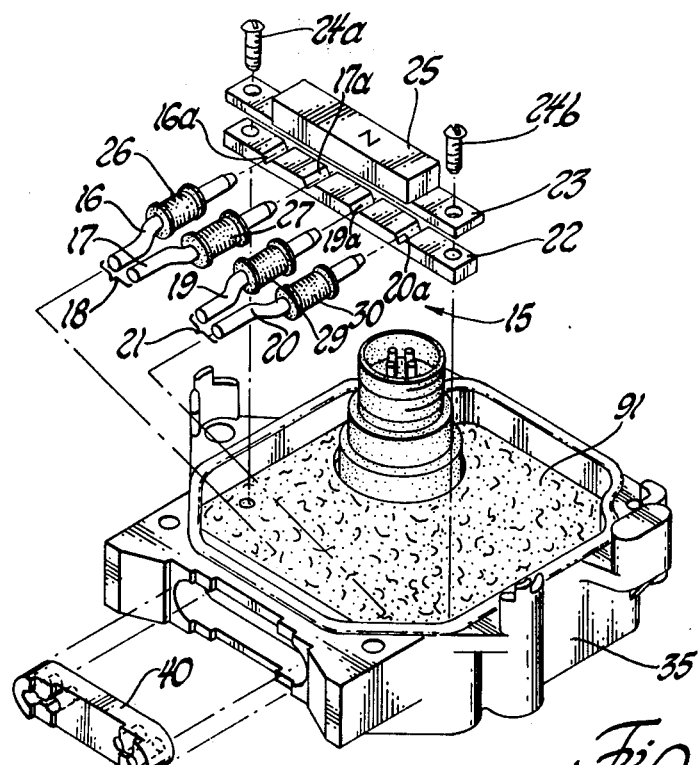
FIG. 4 is an exploded view of the magnetic flux generating and pickup arrangement.

Referring to FIG. 1, the shared reluctance type magnetic pickup arrangement of this invention is illustrated, partially in section. A rotatably mounted circular disk 10 of a soft magnetic material having a plurality of teeth, typically referenced by numerals 11 and 11A, about the circumference thereof, is provided. The significance of the "wide" teeth 11 and the "narrow" teeth 11A will be later explained. In the interest of reducing drawing size, only a portion of rotatably mounted circular disk 10 is illustrated in FIG. 1. Disk 10 is mounted for rotation about the horizontal center axis 12 thereof, as viewing FIG. 1, in a manner well-known in the magnetic pickup art. The magnetic flux generating and pickup arrangement, generally illustrated at 15, is similar to that disclosed and described in copending U.S. Pat. application Ser. No. 609,788, filed September 2, 1975, and assigned to the same assignee as is this application. As is best illustrated in FIG. 4, one end of each of leg members 16, 17, 19 and 20, all of a soft magnetic material, is retained in a respective accommodating notch 16a, 17a, 19a, and 20a of an armature member 22 by a clamping member 23, both of a soft magnetic material, upon the tightening of screws 24a and 24b into accommodating threaded bores in enclosure 35. At the extremity of leg members 16 and 17 remote from armature member 22, leg members 16 and 17 converge to form a first split pole tip 18 and at the extremity of leg members 19 and 20 remote from armature member 22, leg members 19 and 20 converge to form a second split pole tip 21. Split pole tip 18 includes the diameter of both leg members 16 and 17 and the gap therebetween and split pole tip 21 includes the diameter of both leg members 19 and 20 and the gap therebetween. Preferably, each of split pole tips 18 and 21 is of a width substantially equal to three-fourths of the pitch P of teeth 11, as is best illustrated in FIG. 3. Optimum signal generation is realized when the split pole tips, including the respective air gaps, are dimensioned relative to the teeth 11 of disk 10 as shown in FIG. 3. A permanent magnet 25, magnetized in a direction as best shown in FIG. 2, is placed in direct contact with clamping member 23 and is, hence, located in magnetic circuit relationship with leg members 16, 17, 19 and 20. In the drawing, permanent magnet 25 is illustrated as being oriented in the direction in which the south pole is adjacent clamping member 23. It is to be specifically understood that permanent magnet 25 may be oriented in the opposite direction with the north pole adjacent clamping member 23. The use of a single permanent magnet to provide flux for both signal generating paths provides some compensation for mechanical effects such as gapping, aging and temperature to retain balance of output signal strengths.

Pickup coils 26, 27, 29 and 30 are wound about respective leg members 16, 17, 19 and 20 and are, consequently, in magnetic flux linking relationship with the flux generated by permanent magnet 25. If desired, each of pickup coils 26, 27, 29 and 30 may be wound upon a respective spool of any suitable insulating material in a manner well-known in the art. Pickup coils 26 and 27 are connected in series and in an opposite polarity sense and pickup coils 29 and 30 are connected in series and in an opposite polarity sense, as is best shown in FIG. 3.

The magnetic flux generating and pickup arrangement may be mounted within an enclosure 35 of a nonmagnetic material such as aluminum which is provided with a cover member 36 of a magnetic material. Enclosure 35 may be mounted upon a stationary member 37, FIG. 2, and so located that the split pole tips 18 and 21 are in magnetic air gap relationship with the teeth 11 and 11A of disk 10. Cover member 36 is formed to extend below the split pole tips 18 and 21, as shown best in FIG. 2 and by phantom lines in FIG. 1a and to be in magnetic air gap 38 relationship, FIG. 2, with disk 10. A shorting ring or damper winding 40 of an electrically conductive material such as aluminum or copper may be placed about each free end of leg members 18 and 21. Shorting ring 40, sometimes referred to as a "damper ring"or an "amortisseur"or "shading ring,"is an essential part in that it ensures balanced modulation of the magnetic circuit. This shorting ring acts as a short-circuited transformer secondary winding and thus tends to compensate for variations of the total flux entering leg members 16 and 17, or 19 and 20. With this arrangement, the relative signal properties in each of pickup coils 26, 27, 29 and 30 are improved and external effects on the assembly such as unwanted or spurious signals due to vibration, shock, disk eccentricity, disk wobble, magnetized teeth, bent teeth and stray magnetic fields is reduced.

Referring to FIG. 2, the magnetic circuit for the magnetic flux produced by permanent magnet 25 may be traced from one side thereof into cover member 36, through cover member 36 in a direction toward disk 10, across magnetic air gap 38 into disk 10, across the magnetic air gaps 41 and 42, FIG. 1, between the teeth of disk 10 and respective split pole tips 18 and 21, upwardly, as looking at FIGS. 1 and 2, through leg members 16, 17, 19 and 20 and through armature member 22 and clamping member 23 to the other side of permanent magnet 25.

For purposes of this specification and without intention or inference of a limitation thereto, it will be assumed that disk 10 is being rotated in a clockwise direction as indicated by the arrow in FIG. 1. As one of the plurality of teeth 11 or 11A about the circumference of disk 10 approaches split pole tip 18, a greater amount of magnetic flux is conducted across magnetic air gap 41 into leg member 16 and the amount of disk flux increases as one of the teeth 11 or 11A passes by that portion of split pole tip 18 formed by leg member 16 until the tooth approaches that portion of split pole tip 18 formed by leg member 17. As one of the teeth 11 or 11A approaches the portion of split pole tip 18 formed by leg member 17, an increasing amount of flux is conducted across magnetic air gap 41 and through leg member 17. As one of the teeth 11 or 11A moves away from that portion of split pole tip 18 formed by leg member 16, a decreasing amount of flux is conducted across magnetic air gap 41 and through leg member 16 and an increasing amount of flux is conducted across air gap 41 and through leg member 17. That is, a greater amount of flux initially links pickup coil 26 wound about leg member 16 and later an increasing amount of flux links pickup coil 27 wound upon leg member 17 while, simultaneously, a decreasing amount of flux links pickup coil 16. Therefore, a net signal output is obtained across the output leads 26a and 27b, FIG. 3, of pickup coils 26 and 27 even though they are connected in series and in an opposite polarity sense.

The same sequence of events occurs as one of the teeth 11 or 11A approaches and passes split pole tip 21 formed by leg members 19 and 20. Consequently, as disk 10 is rotated, a series of respective alternating current wave forms I and II, FIGS. 6 and 7, is generated in each of pickup coil pairs 26–27 and 29–30. These wave forms appear across output leads 26a and 27b of pickup coil pair 26–27 and across output leads 29a and 30b of pickup coil pair 29–30.

The principal advantage of this arrangement is the fact that ambient stray magnetic field induce the same voltage in each of the pickup coils of each pair which are of an opposite polarity and, therefore, are canceled by the winding connections.

The electronic circuit portion of the electrical signal generating system of this invention is responsive to alternate changes of phase relationship between the series of alternating current wave forms generated in respective pickup coil pairs 26–27 and 29–30 to initiate and terminate the system periodic output signal of a predeterminable duration in a manner to be later explained. Therefore, structure is provided for changing the phase relationship between the series of alternating current wave form I generated in pickup coil pair 26–27 and the series of alternating current wave forms II generated in pickup coil pair 29–30 at preselected intervals. In the preferred embodiment and without intention or inference of a limitation thereto, this structure is the location of a single narrow disk tooth 11A of a width one-half that of the wide teeth 11 at preselected intervals around the circumference of toothed disk 10. As, in the preferred embodiment, the electrical signal generating system of this invention is employed with an eight-cylinder internal combustion engine equipped with a digital electronic computer type spark timing system, a narrow tooth 11A is located every ninety mechanical degrees about the circumference of toothed disk 10, two of which are referenced in FIG. 1 as only a portion of disk 10 is therein shown. It is to be specifically understood, however, that other selected narrow disk tooth spacings as required by other specific applications and other notch sizes and spacings may be employed without departing from the spirit of the invention.

The predetermined number of electrical degrees by which the generated alternating current wave forms I and II are normally displaced from each other while the wide disk teeth 11 are simultaneously passing split pole tips 18 and 21 is determined by the mechanical center line to center line spacing between split pole tips 18 and 21. As each wide tooth pitch P, FIG. 3, is equivalent to 360 generated alternating current wave form electrical degrees, to provide any desired phase displacement between the two series of generated alternating current wave forms, the mechanical center line to center line spacing between split pole tips 18 and 21 is the fraction of the wide tooth pitch P that the desired phase displacement is of 360 electrical degrees. For example, the 90° electrical phase displacement, the mechanical center line to center line spacing of split pole tips 18 and 21 is one-fourth of the wide tooth pitch P; for 180° electrical phase displacement, the mechanical center line to center line spacing of split pole tips 18 and 21 is one-half of the wide tooth pitch P and for 45° electrical phase displacement, the mechanical center line to center line spacing of split pole tips 18 and 21 is one-eighth of the wide tooth pitch P.

In the preferred embodiment, the phase displacement between the two generated alternating current wave forms I and II is 135° electrical and the duration of the system periodic output signal is of a period of time corresponding to 13 to 15 mechanical degrees rotation of disk 10 as the leading and trailing edges of this signal are employed during periods of low engine cranking speeds and/or low battery voltage to initiate the energization and deenergization of the ignition coil primary winding of the associated internal combustion engine. The center line to center line spacing of the spaces on each side of each wide tooth 11 of disk 10 employed with the preferred embodiment is 4.8 mechanical degrees and the center line to center line spacing of the spaces on each side of each narrow tooth 11A is 3.6 mechanical degrees. As the system periodic output signal is initiated and terminated upon alternate changes of phase relationship of the generated alternating current wave forms in a manner to be later explained, the mechanical center line to center line spacing between split pole tips 18 and 21 was selected to span a sufficient whole number of disk 10 teeth to provide a system periodic output signal of a duration of time corresponding to 13 to 15 mechanical degrees rotation of disk 10 plus the distance equal to three-eighths the wide tooth 11 pitch P to provide for 135° electrical phase displacement between the two generated alternating current wave forms I and II. A mechanical center line to center line spacing of a distance equal to two and three-eighths of the wide tooth 11 pitch P provides a system periodic output signal of a duration corresponding to 13.2° mechanical.

As each narrow tooth 11A is one-half the width of the wide teeth 11, the half cycle of the alternating current wave form generated in pickup coil pair 26–27 or 29—30 upon the passing of a narrow tooth 11A by split pole tip 18 or 21, respectively, is completed twice as fast as is a half cycle of the alternating current wave form generated in pickup coil pair 26–27 or 29–30 upon the passing of a wide tooth 11 by split pole tip 18 or 21, respectively, at a constant disk 10 rotational speed. That is, the frequency of the one cycle of the series of alternating current wave forms generated in pickup coil pair 26–27 or 29–30 upon the passing of a narrow tooth 11A by split pole tip 18 or 21, respectively, is higher than and, consequently, the wave length thereof is shorter than the cycles of the series of alternating current wave forms generated in pickup coil pair 26–27 or 29–30 upon the passing of wide teeth 11 by split pole tip 18 or 21, respectively. Therefore, and assuming disk 10 is being rotated in a clockwise direction as indicated by the arrow in FIG. 1, upon the passing of a narrow tooth 11A by split pole tip 18, the series of alternating current wave forms I generated in pickup coil pair 26–27 is advanced by 90° electrical relative to the series of alternating current wave forms II generated in magnetic pickup coil pair 29–30 upon the simultaneous passing of a wide tooth 11 by split pole tip 21 and when the same narrow tooth 11A later passes split pole tip 21, the series of alternating current wave forms II generated in pickup coil pair 29–30 is advanced 90° electrical relative to the series of alternating current wave forms I generated in pickup coil pair 26–27 upon the simultaneous passing of a wide tooth 11 by split pole tip 18. In the preferred embodiment, therefore, between successive narrow teeth 11A, generated alternating current wave form I leads generated alternating current wave II by 135° electrical. Upon the passing of a narrow tooth 11A by split pole tip 18, generated alternating current wave form I is advanced 90° electrical, consequently, while the same narrow tooth 11A is passing between split pole tips 18 and 21, the generated alternating current wave form I leads the generated alternating current wave form II by 225° electrical or, considered in another way, generated alternating current wave form I now lags generated alternating current wave form II by 135° electrical, as best seen in FIG. 7. When the same narrow tooth 11A passes by split pole tip 21, generated alternating current wave form II is advanced 90° electrical, consequently, until the next narrow tooth 11A passes split pole tip 18, generated alternating current wave form I again leads generated alternating current wave form II by 135° electrical. With this structure, therefore, the phase relationship between the generated alternating current wave forms is changed at predetermined intervals by changing the wave length of 1 cycle of each of the generated alternating current wave forms at predetermined intervals as determined by the spacing of narrow teeth 11A and by the mechanical center line to center line spacing of split pole tips 18 and 21. It may be noted that the structure hereinabove described periodically effects a first and a second change of phase relationship of the generated alternating current wave forms corresponding to each narrow tooth 11A, each of the first and second changes of phase relationship being separated by a selected number of electrical degrees as determined by the mechanical center line to center line spacing of split pole tips 18 and 21.

Referring to FIG. 5, the electronic portion of the electrical signal generating system of this invention is set forth partially in schematic and partially in block form. As point of reference or ground potential is the same point electrically throughout the system, it has been illustrated in FIG. 5 by the accepted schematic symbol and referenced by the numeral 5.

Junction 45 between pickup coil pairs 26–27 and 29–30 is connected to point of reference or ground potential 5 and load resistors 46 and 47 are connected across the free ends of respective pickup coils 26 and 30 and point of reference or ground potential 5. Resistors 46 and 47 are of a relatively low ohmic value which, in the preferred embodiment, is 330 ohms each. The ohmic value of these load resistors serve to suppress unwanted noise signals induced in pickup coil pairs 26–27 and 29–30, to limit the magnitude of useful signals generated in these coil pairs so as to not overload the remainder of the electronic circuitry and to control the time delay of useful signals to predictable values.

An instrument having a substantially infinite input impedance would indicate a potential across the terminal ends of a coil of wire suspended in space and magnetically linked to an electromagnetic field produced by a source of noise. By connecting a variable resistor across the terminal ends of the coil, it may be observed that, for high values of resistance there is no appreciable attenuation of the induced signal. However, below a specific value of resistance, the resulting signal magnitude will be directly proportional to the value of resistance, being zero at zero resistance. To attenuate spurious signals, therefore, it is desirable to use a load resistance of a relatively low ohmic value. If a permanent magnet is rotated in magnetic flux linking arrangement with the coil suspended in space, a potential is induced in the coil. With an infinite load resistance, this potential is directly proportional to the speed of rotation of the magnet. As the ohmic value of the load resistance is reduced, for each particular ohmic value of load resistance there is a definite maximum observed potential, the lower the load resistance, the lower the definite maximum observed potential. As a consequence of the decreasing definite maximum observed potential as the ohmic value of the load resistance is reduced, the maximum observed potential is present for a greater range of magnet rotational speeds as the ohmic value of the load resistance is reduced. Thus, by choosing a low ohmic value load resistance, and otherwise designing properly, a substantially constant coil potential throughout the speed range of the magnetic pickup may be realized. As the load resistance is changed, the phase delay of the induced potential is substantially minus 90° electrical throughout most of the useful speed range. That is, there is a constant phase delay. The selection of load resistance of low ohmic value, therefore, provides best noise rejection; controlled signal amplitude and controlled signal phase delay.

To produce additional auxiliary alternating current wave forms phase displaced from each other and from the alternating current wave forms induced in pickup coil pairs 26–27 and 29–30 by the same number of electrical degrees, the generated alternating current wave forms may be summed across a series resistor network corresponding to each additional auxiliary alternating current wave form desired. In the preferred embodiment, two additional alternating current auxiliary wave forms phase displaced from each other and from the generated alternating current wave forms by 45° electrical was required. Consequently, series resistor network 51–52 and 53–54 are employed. As is shown by the vector diagram of FIG. 8, by properly proportioning the ohmic value of series resistors 51 and 52, an auxiliary alternating current wave form III phase displaced from generated alternating current wave form I by 45° electrical may be produced and by properly proportioning the ohmic value of series resistors 53 and 54, another auxiliary alternating current wave form IV phase displaced from auxiliary alternating current wave form III and from generated alternating current wave form II by 45° electrical is produced. To provide this equal 45° electrical phase displacement between the generated and auxiliary alternating current wave forms, the ohmic value of series resistors 51 and 52 are proportioned 40 and 60%, respectively, and the ratio of the ohmic value of series resistors 53 and 54 are proportioned 60 and 40%, respectively. In the preferred embodiment, the resistor corresponding to resistor 51 is 4000 ohms, the resistor corresponding to resistor 52 is 6000 ohms, the resistor corresponding to resistor 53 is 6000 ohms and the resistor corresponding to resistor 54 is 4000 ohms.

The generated alternating current wave forms I and II and the auxiliary alternating current wave forms III and IV are inverted by and converted to square wave forms by respective comparator circuits 55, 58, 57 and 56. The resulting inverted square wave form signals corresponding to and derived from each of generated alternating current wave forms I and II are represented in the drawing by curves A and C of FIGS. 6 and 7 and the resulting inverted square wave form signals corresponding to and derived from auxiliary alternating current wave forms III and IV are represented in the drawing by curves D and E of FIG. 7.

Comparator circuits 55 through 58, inclusive, may be commercially available comparator circuit integrated circuit modules well-known in the art. In the preferred embodiment, the comparator circuit corresponding to each of comparator circuits 55 through 58, inclusive, is one section of a bi-polar linear quad comparator integrated circuit module 50 marketed by the National Semiconductor Corporation under the designation LM139AD. Resistors 61, 62, 63 and 64 are pull-up resistors for the uncommitted collector electrode of the grounded emitter NPN output transistor of respective comparator circuits 55, 57, 56 and 58.

A direct current potential supply circuit for the electronic circuitry of FIG. 5 is provided and includes a source of direct current potential, which may be a conventional storage battery 8, resistors 65 and 66, Zener diodes 67 and 68, positive polarity bus 69 and point of reference or ground potential 5. It is to be specifically understood that any conventional source of direct current potential may be substituted for battery 8 without departing from the spirit of the invention. Series connected resistor 66 and Zener diode 67 and series connected resistor 65 and Zener diode 68 serve to "clip"high positive polarity potential transients which may appear upon the supply line to prevent destruction of the electronic circuitry; to prevent negative polarity potential transients from damaging the electronic circuitry; to protect the electronic circuitry from accidental power supply reverse polarities and to limit the maximum operating potential across positive polarity potential bus 69 and point of reference or ground potential 5 thereby permitting the electronic circuitry to operate through a much higher and wider range of supply potential than could be otherwise tolerated.

Operating potential for the quad comparator integrated circuit module 50 and for the output transistors of each of comparator circuits 55 through 58, inclusive, is taken from junction 70 between series connected resistor 66 and Zener diode 67 and operating potential for the remainder of the electronic circuitry of FIG. 5 is taken across positive polarity potential bus 69 and point of reference or ground potential 5.

The generation of the system periodic output signal of a predeterminable duration upon alternate changes of the phase relationship between the generated alternating current wave forms will be described with reference to FIGS. 5 and 6. The square wave form output signal of comparator circuit 55, curve A of FIG. 6, corresponding to and derived from generated alternating current wave form I is inverted by NPN transistor 60, having the current carrying electrodes thereof connected across positive polarity bus 69 and point of reference or ground potential 5 through collector resistor 71, and appears across junction 72 and point of reference or ground potential 5, curve B of FIG. 6. The square wave form output signal of comparator circuit 58, curve C of FIG. 6, corresponding to and derived from generated alternating current wave form II in inverted by and appears upon the output circuit of exclusive OR gate 76, curve D of FIG. 6. The output signal of exclusive OR gate 76 is slightly delayed by the resistor 74-capacitor 75 delay circuit network, the delayed signal appearing across junction 73 and point of reference or ground potential 5, curve E of FIG. 6. The output signal of comparator circuit 58, curve C, is also applied through current limiting resistor 49 to the base electrode of NPN transistor 80 and the delayed signal appearing across junction 73 and point of reference or ground potential 5, curve E, is applied to the base electrode of NPN transitor 81. As the current carrying electrodes of NPN transistors 80 and 81 are connected in parallel across positive polarity potential bus 69 and point of reference or ground potential 5 through common collector resistor 82, an electrical reference signal appears across junction 83 and point of reference or ground potential 5, curve F of FIG. 6, only while both NPN transistors 80 and 81 are not conductive. As both transistors 80 and 81 are NPN transistors, this reference signal, curve F, appears across junction 83 and point of reference or ground potential 5 only while the output signal of comparator circuit 58 and the delayed signal upon junction 73 are of substantially ground potential, a condition under which both NPN transistors 80 and 81 are not conductive. The square wave form signal corresponding to and derived from generated alternating current wave form I appearing upon the output circuit of comparator circuit 55, curve A, and the reference signal, curve F, appearing across junction 83 and point of reference or ground potential 5 are applied to respective input circuit terminals of a conventional commercially available NAND gate 87 and the inverted output signal of comparator circuit 55 appearing across junction 72 and point of reference or ground potential 5, curve B, and the reference signal, curve F, are applied to respective input terminals of a conventional commercially available NAND gate 86. As a two input NAND gate produces a logic 1 output signal with logic 0 signal present upon either of the input terminals thereof and a logic 0 output signal with the presence of a logic 1 signal upon both input terminals thereof, NAND gate 87 produces as an output a logic 0 system periodic output signal initiating signal pulse, curve G of FIG. 6, while both the output signal of comparator circuit 55, curve A, and the reference signal, curve F, are of a positive polarity and NAND gate 86 produces an an output a logic 0 system periodic output signal terminating signal pulse, curve H of FIG. 6, while both the signal appearing across junction 72 and point of reference or ground potential 5, curve B, and the reference signal, curve F are of a positive polarity. To produce the system periodic output signal, electrical signal responsive circuitry operable between first and second conditions of operation in response to the system periodic output signal initiating and terminating signal pulses, respectively, is provided. In the preferred embodiment, this electrical signal responsive circuitry is a well-known RS flip-flop circuit including NAND gates 88 and 89 having the output terminals thereof cross-connected. The RS flip-flop circuit is a well-known logic circuit element which produces a logic 1 signal upon the "Q"output terminal thereof upon the application of a logic O signal to the $\overline{S}$ input terminal and a logic 0 signal upon the Q output terminal upon the application of a logic O to the "$\overline{R}$" input terminal. The logic O system periodic output signal initiating signal pulse, curve G, produced by NAND gate 87 and the logic 0 system periodic output signal terminating signal pulse, curve H, are applied to the $\overline{S}$ input terminal and the $\overline{R}$ input terminal of the RS flip-flop circuit configuration, respectively. Upon the occurrence of the first reference signal, curve F, after the change of wave length of one cycle of generated alternating current wave form I, the reference signal, curve F, and the square wave output signal of comparator circuit 55, curve A, are both of a positive polarity, consequently, NAND gate 87 produces the logic O system periodic output signal initiating signal pulse of a width equal to the width of the reference signal, curve G. This logic O signal is applied to the $\overline{S}$ input terminal of NAND gate 88 of the RS flip-flop circuit to place the RS flip-flop circuit in the Set condition in which a logic 1 signal is present across output terminal 84 and point of reference or ground potential 5, curve I of FIG. 6 which shows the system peridoic output signals. The subsequent system periodic output signal initiating signal pulses produced by NAND gate 87, curve G, are ineffective as RS flip-flop circuit is already in the Set condition. Upon the occurrence of the first reference signal, curve F, after the change of wave length of 1 cycle of generated alternating current wave form II, 2 ⅜ disk teeth after the wave length of one cycle of generated alternating current wave form I was changed, the reference signal, curve F, and the signal appearing across junction 72 and point of reference or ground potential 5, curve B, are both of a positive polarity, consequently, NAND gate 86 produces the logic O system periodic output signal terminating signal pulse of a width equal to the width of the reference signal, curve H. This logic O signal is applied to the $\overline{R}$ input terminal of NAND gate 89 of the RS flip-flop circuit to trigger the RS flip-flop circuit to the Reset condition in which a logic O signal is present across output terminal 84 and point of reference of ground potential 5, curve I. The subsequent system periodic output signal terminating signal pulses produced by NAND gate 87, curve H, are ineffective as the RS flip-flop circuit is already in the Reset condition. Upon the next change of wave length of one cycle of generated alternating current wave form I and 2 ⅜ disk 10 teeth later the change of wave length of one cycle of generated alternating current wave form II, the sequence of events just described is repeated to initiate and terminate another system periodic output signal. In the event the application with which the electrical signal generating system of this invention is employed requires a logic O system periodic output signal of a predetermined duration, the system periodic output signal may be taken from the "Q" output terminal of the RS flip-flop circuit. Thus, the RS flip-flop circuit produces the system periodic output signal while in the Set condition of operation.

It is apparent from the foregoing description that the logic gating circuit combination just described is responsive to the generated alternating current wave forms for initiating the system periodic output electrical signal upon alternate changes of phase relationship of the generated alternating current wave forms and for terminating the system periodic output electrical signal upon the other alternate changes of phase relationship of the generated alternating current wave forms as the phase relationship between the generated alternating current wave forms is changed each time the wave length of one of the cycles of each of the generated alternating current wave forms is changed in the manner previously described.

The NAND gates 86 through 89, inclusive, may be conventional commercially available NAND gate packages. In the preferred embodiment, the NAND gate corresponding to each of NAND gates 86, 87, 88 and 89 is one section of quad NAND gate integrated circuit package 85 marketed by the Fairchild Camera & Instrument Corporation under the designation 34011.

The production of the series of output signal pulses of a frequency which is a multiple, as determined by the total number of generated and auxiliary alternating current wave forms, of the frequency of the generated and auxiliary alternating current wave forms will be described with reference to FIGS. 5 and 7.

The logic gating circuit combination comprised of conventional exclusive OR gates 77, 78 and 79 combines the generated alternating current wave forms and the auxiliary alternating current wave forms in a manner to produce the series of other output signal pulses. The squared and inverted wave forms corresponding to and derived from generated alternating current wave form II, appearing upon the output terminal of comparator circuit 58, curve C of FIG. 7 and the squared and inverted square wave form corresponding to and derived from auxiliary current wave form IV, appearing upon the output terminal of comparator circuit 56, curve E of FIG. 7, are impressed upon respective input terminals of conventional exclusive OR gate 77. As a two input exclusive OR gate produces a logic 1 output signal with logic signals of different polarity upon respective input terminals and a logic 0 signal with logic signals of the same polarity upon respective input terminals, two input exclusive OR gate 77 produces a logic 1 output signal pulse while the output signals of comparator circuits 56 and 58 are of different polarity. These logic 1 exclusive OR gate 77 output signals are represented by curve F of FIG. 7. The squared and re-inverted wave form corresponding to and derived from generated alternating curve wave form I appearing across junction 72 and point of reference or ground potential 5, curve B of FIG. 7, and the squared and inverted wave form corresponding to and derived from auxiliary alternating current wave form III appearing upon the output terminal of comparator circuit 57, curve D of FIG. 7, are impressed upon respective input terminals of conventional exclusive OR gate 79. As two input exclusive OR gates produce logic 1 output signals with the input signal combinations previously described with reference to exclusive OR gate 77, two input exclusive OR gate 79 produces a logic 1 output signal pulse while the signals appearing upon junction 72 and the output signal of comparator circuit 57 are of different polarity. These logic 1 exclusive OR gate 79 output signals are represented by curve G of FIG. 7. The output signals of exclusive OR gate 77, curve F, and the output signals of exclusive OR gate 79, curve G, are impressed upon the input terminals of conventional exclusive OR gate 78. As two input exclusive OR gates produce logic 1 output signals with the input signal combinations previously described with regard to exclusive OR gate 77, two input exclusive OR gate 78 produces a logic 1 output signal while the output signals of exclusive OR gates 77 and 79 are of different polarity. These logic 1 exclusive OR gate 78 output signals are represented by curve H of FIG. 7. Consequently, exclusive OR gate 78 produces a series of signal pulses upon the output terminal thereof, curve H, of a frequency equal to four times the frequency of the generated alternating current wave forms as is evident by comparing curve H with any one of curves A, B or C. These signals appear across output terminal 90 and point of reference or ground potential 5.

The exclusive OR gates 76 through 79, inclusive, may be conventional commercially available OR gate packages. In the preferred embodiment, the exclusive OR gate corresponding to each of exclusive OR gates 76, 77, 78 or 79 is one section of a quad exclusive OR gate integrated circuit package 34030 marketed by the Fairchild Camera & Instrument Company.

In the event the electrical signal generating circuit of this invention is to be used with an application requiring the series of output signal pulses to be of a reverse polarity, the output signals of exclusive OR gate 78 may be inverted by any convenient and well-known technique.

The electronic circuitry of this invention has been described on the basis of inverting and squaring the generated and auxiliary alternating current wave forms. These wave forms have been inverted in the preferred embodiment only because the comparator circuits corresponding to comparator circuits 55 through 58, inclusive, more readily lend themselves to polarity inversion. It is to be specifically understood that the generated and auxiliary alternating current wave forms need not be inverted to comply with the spirit of this invention provided the associated gating circuitry combinations are arranged to accept the different polarity squared wave forms. It is only necessary that the generated and alternating current wave forms be conditioned, such as by squaring, to be compatible with the corresponding gating circuitry selected.

In the preferred embodiment, the electronic circuitry of FIG. 5 is mounted upon a printed circuit board and mounted within the space 91 within enclosure 35.

While a preferred embodiment of the preferred invention has been shown and described, it will be obvious to those skilled in the art that various modifications and substitutions may be made without departing from the spirit of the invention which is to be limited only within the scope of the appended claims.

What is claimed is:

1. An electrical signal generating system comprising: means for generating two alternating current wave forms phase displaced from each other by a selected number of electrical degrees and for changing the phase relationship thereof at predetermined intervals; means for producing a reference signal pulse at selected zero crossover points of each cycle of a selected one of said alternating current wave forms; means for inverting the other one of said alternating current wave forms; means responsive to said reference signal pulses and selected polarity half cycles of the said other one of said alternating current wave forms for producing system periodic output signal initiating signal pulses; means responsive to said reference signal pulses and selected polarity half cycles of the inverted said other one of said alternating current wave forms for producing system periodic output signal terminating signal pulses; and an electrical signal responsive circuit means operable between first and second conditions of operation in response to said system periodic output signal initiating and terminating signal pulses for producing a system periodic output signal while in a selected one of said first and second conditions of operation.

2. An electrical signal generating system comprising: means for generating two alternating current wave forms phase displaced from each other by a selected number of electrical degrees and for changing the phase relationship thereof at predetermined intervals; means for producing a reference signal pulse at selected zero crossover points of each cycle of a selected one of said alternating current wave forms; means for inverting the other one of said alternating current wave forms; means responsive to said reference signal pulses and selected polarity half cycles of the said other one of said alternating current wave forms for producing system periodic output signal initiating signal pulses; means responsive to said reference signal pulses and selected polarity half cycles of the inverted said other one of said alternating current wave forms for producing system periodic output signal terminating signal pulses; an electrical signal responsive circuit means operable between first and second conditions of operation in response to said system periodic output signal initiating and terminating signal pulses for producing a system periodic output signal while in a selected one of said first and second conditions of operation; means for producing a plurality of auxiliary alternating current wave forms phase displaced from each other and from said generated alternating current wave forms by the same number of electrical degrees; and a logic gating circuit combination for combining selected said generated and auxiliary alternating current wave forms in a manner to produce a series of other output signal pulses of a frequency which is a multiple, as determined by the total number of said generated and auxiliary alternating current wave forms, of the frequency of said generated alternating current wave forms.

3. An electrical signal generating system comprising: a magnetic pickup arrangement including at least a rotatable toothed disk of a magnetic material and two magnetic pole pieces in magnetic circuit relationship and a respective pickup coil arrangement in magnetic flux linking relationship with each of said magnetic pole pieces for generating two phase displaced alternating current wave forms when said toothed disk is rotated; means included in said magnetic pickup arrangement for changing the phase relationship of said alternating current wave forms at predetermined intervals; and a logic gating circuit combination responsive to said alternating current wave forms for initiating a system periodic output signal upon alternate changes of phase relationship of said alternating current wave forms and for terminating said system periodic output signal upon the other alternate changes of phase relationship of said alternating current wave forms, said two magnetic pole pieces of said magnetic pickup arrangement being mechanically separated from each other about the periphery of said toothed disk by a distance determined by the fractional portion of the center line to center line spacing of the teeth of said toothed disk which will provide a phase displacement between said alternating current wave forms of a predetermined number of electrical degrees plus the additional separation required to provide a system periodic output signal of a predetermined duration.

4. An electrical signal generating system comprising: a magnetic pickup arrangement including at least a rotatable toothed disk of a magnetic material and two magnetic pole pieces in magnetic circuit relationship and a respective pickup coil arrangement in magnetic flux linking relationship with each of said magnetic pole pieces for generating two phase displaced alternating current wave forms when said toothed disk is rotated; means included in said magnetic pickup arrangement for periodically effecting a first and a second change of phase relationship of said generated alternating current wave forms, each of said first and second changes of phase relationship being separated by a selected number of electrical degrees; and a logic gating circuit combination responsive to said alternating current wave forms for initiating a system periodic output signal upon each said first change of phase relationship of said alternating current wave forms and for terminating said system periodic output signal upon each said second change of phase relationship of said alternating current wave forms, said two magnetic pole pieces of said magnetic pickup arrangement being mechanically separated from each other about the periphery of said toothed disk by a distance determined by the fractional portion of the center line to center line spacing of the teeth of said toothed disk which will provide a phase displacement between said alternating current wave forms of a predetermined number of electrical degrees plus the additional separation required to provide the selected number of electrical degrees by which each said first and second changes of phase relationship of said alternating current wave forms are separated.

5. An electrical signal generating system comprising: a magnetic pickup arrangement including at least a rotatable toothed disk of a magnetic material and two magnetic pole pieces in magnetic circuit relationship and a respective pickup coil arrangement in magnetic flux linking relationship with each of said magnetic pole pieces for generating two phase displaced alternating current wave forms when said toothed disk is rotated; means included in said magnetic pickup arrangement for changing the wave length of one cycle of each of said alternating current wave forms at different predetermined intervals; and a first logic gating circuit combination responsive to said alternating current wave forms for initiating a system periodic output signal upon each change of wave length of one cycle of a selected one of said alternating current wave forms and for terminating said system periodic output signal upon each change of wave length of one cycle of the other one of said alternating current wave forms, said two magnetic pole pieces of said magnetic pickup arrangement being mechanically separated from each other about the periphery of said toothed disk by a distance determined by the fractional portion of the center line to center line spacing of the teeth of said toothed disk which will provide a phase displacement between said alternating current wave forms of a predetermined number of electrical degrees plus the additional separation required to provide a system periodic output signal of a predetermined duration; means for producing a plurality of auxiliary alternating current wave forms phase displaced from each other and from said generated alternating current wave forms by the same number of electrical degrees; and a second logic gating circuit combination for combining selected said generated and auxiliary alternating current wave forms in a manner to produce a series of other output signal pulses of a frequency which is a multiple, as determined by the total number of said generated and auxiliary alternating current wave forms, of the frequency of said generated alternating current wave forms.

6. An electrical signal generating system comprising: a magnetic pickup arrangement including at least a rotatable toothed disk of a magnetic material and two magnetic pole pieces in magnetic circuit relationship and a respective pickup coil arrangement in magnetic flux linking relationship with each of said magnetic pole pieces for generating two phase displaced alternating current wave forms when said toothed disk is rotated; means included in said magnetic pickup arrangement for changing the phase relationship of said alternating current wave forms at predetermined intervals; a first logic gating circuit combination responsive to said alternating current wave forms for initiating a system periodic output signal upon alternate changes of phase relationship of said alternating current wave forms and for terminating said system periodic output signal upon the other alternate changes of phase relationship of said alternating current wave forms, said two magnetic pole pieces of said magnetic pickup arrangement being mechanically separated from each other about the periphery of said toothed disk by a distance determined by the fractional portion of the center line to center line spacing of the teeth of said toothed disk which will provide a phase displacement between said alternating current wave forms of a predetermined number of electrical degrees plus the additional separation required to provide a system periodic output signal of a predetermined duration; means for producing a plurality of auxiliary alternating current wave forms phase displaced from each other and from said generated alternating current wave forms by the same number of electrical degrees; and a second logic gating circuit combination for combining selected said generated and auxiliary alternating current wave forms in a manner to produce a series of other output signal pulses of a frequency which is a multiple, as determined by the total number of said generated and auxiliary alternating current wave forms, of the frequency of said generated alternating current wave forms.

7. An electrical signal generating system comprising: a magnetic pickup arrangement including at least a rotatable toothed disk of a magnetic material and two magnetic pole pieces in magnetic circuit relationship and a respective pickup coil arrangement in magnetic flux linking relationship with each of said magnetic pole pieces for generating two phase displaced alternating current wave forms when said toothed disk is rotated; means included in said magnetic pickup arrangement for periodically effecting a first and a second change of phase relationship of said alternating current wave forms, each of said first and second changes of phase relationship being separated by a selected number of electrical degrees; a first logic gating circuit combination responsive to said alternating current wave forms for initiating a system periodic output signal upon each said first change of phase relationship of said alternating current wave forms and for terminating said system periodic output signal upon each said second change of phase relationship of said alternating current wave forms, said two magnetic pole pieces of said magnetic pickup arrangement being mechanically separated from each other about the periphery of said toothed disk by a distance determined by the fractional portion of the center line to center line spacing of the teeth of said toothed disk which will provide a phase displacement between said alternating current wave forms of a predetermined number of electrical degrees plus the additional separation required to provide the selected number of electrical degrees by which each said first and second changes of phase relationship of said alternating current wave forms are separated; means for producing a plurality of auxiliary alternating current wave forms phase displaced from each other and from said generated alternating current wave forms by the same number of electrical degrees; and a second logic gating circuit combination for combining selected said generated and auxiliary alternating current wave forms in a manner to produce a series of other output signal pulses of a frequency which is a multiple, as determined by the total number of said generated and auxiliary alternating current wave forms, of the frequency of said generated alternating current wave forms.

8. An electrical signal generating system comprising: a magnetic pickup arrangement including at least a rotatable toothed disk of a magnetic material and two magnetic pole pieces in magnetic circuit relationship and a respective pickup coil arrangement in magnetic flux linking relationship with each of said magnetic pole pieces for generating two phase displaced alternating current wave forms when said toothed disk is rotated; means included in said magnetic pickup arrangement for changing the wave length of one cycle of each of said alternating current wave forms at different predetermined intervals; and a logic gating circuit combination responsive to said alternating current wave forms for initiating a system periodic output signal upon each change of wave length of one cycle of a selected one of said alternating current wave forms and for terminating said system periodic output signal upon each change of wave length of one cycle of the other one of said alternating current wave forms, said two magnetic pole pieces of said magnetic pickup arrangement being mechanically separated from each other about the periphery of said toothed disk by a distance determined by the fractional portion of the center line to center line spacing of the teeth of said toothed disk which will provide a phase displacement between said alternating current wave forms of a predetermined number of electrical degrees plus the additional separation required to provide a system periodic output signal of a predetermined duration.

9. An electrical signal generating system comprising: means for generating two alternating current wave forms phase displaced from each other by a selected number of electrical degrees and for changing the phase relationship thereof at predetermined intervals; means for converting said alternating current wave forms into corresponding respective inverted square wave forms; means for producing a reference signal pulse at selected zero crossover points of each cycle of a selected one of said alternating current wave forms; means for re-inverting the square wave form corresponding to the other one of said alternating current wave forms; means responsive to said reference signal pulses and a selected electrical polarity of the said inverted square wave forms corresponding to the other one of said alternating current wave forms for producing system periodic output signal initiating signal pulses; means responsive to said reference signal pulses and a selected electrical polarity of the said re-inverted square wave forms corresponding to the said other one of said alternating current wave forms for producing system periodic output signal terminating signal pulses; and an electrical signal responsive circuit means operable between first and second conditions of operation in response to said system periodic output signal initiating and terminating signal pulses for producing a system periodic output signal while in a selected one of said first and second conditions of operation.

10. An electrical signal generating system comprising:
means for generating two alternating current wave forms phase displaced from each other by a selected number of electrical degrees and for changing the phase relationship thereof at predetermined intervals; means for converting said alternating current wave forms into corresponding respective inverted square wave forms; means for producing a reference signal pulse at selected zero crossover points of each cycle of a selected one of said alternating current wave forms; means for re-inverting the square wave form corresponding to the other one of said alternating current wave forms; means responsive to said reference signal pulses and a selected electrical polarity of the said inverted square wave forms corresponding to the other one of said alternating current wave forms for producing system periodic output signal initiating signal pulses; means responsive to said reference signal pulses and a selected electrical polarity of the said re-inverted square wave forms corresponding to the said other one of said alternating current wave forms for producing system periodic output signal terminating signal pulses; an electrical signal responsive circuit means operable between first and second conditions of operation in response to said system periodic output signal initiating and terminating signal pulses for producing a system periodic output signal while in a selected one of said first and second conditions of operation; means for producing a plurality of auxiliary alternating current wave forms phase displaced from each other and from said generated alternating current wave forms by the same number of electrical degrees; means for converting said auxiliary alternating current wave forms into corresponding respective inverted square wave forms; and a logic gating circuit combination for combining selected said inverted square wave forms corresponding to said generated and auxiliary alternating current wave forms in a manner to produce a series of other output signal pulses of a frequency which is a multiple, as determined by the total number of said generated and auxiliary alternating current wave forms, of the frequency of said generated alternating current wave forms.

* * * * *

UNITED STATES PATENT AND TRADEMARK OFFICE
CERTIFICATE OF CORRECTION

PATENT NO. : 4,024,458
DATED : May 17, 1977
INVENTOR(S) : Jackson R. Templin

It is certified that error appears in the above-identified patent and that said Letters Patent are hereby corrected as shown below:

Title Page, in the ABSTRACT, "other" should read -- another --;

Column 4, line 42, "Fig. 1a" should read -- Fig. 1 --;

Column 6, line 23, "the" (first occurrence) should read -- for --.

Column 10, line 24, "in" should read -- is --.

Column 11, line 4, "an" first occurrence should read --as

Signed and Sealed this

Twenty-seventh Day of September 197

[SEAL]

Attest:

RUTH C. MASON
Attesting Officer

LUTRELLE F. PARKER
Acting Commissioner of Patents and Trademar